United States Patent [19]

Sepheriades et al.

[11] Patent Number: 4,508,151
[45] Date of Patent: Apr. 2, 1985

[54] NON-SKID DEVICE FOR MOTOR-VEHICLE TIRES

[76] Inventors: Jean Sepheriades, 33, rue Bayen, 75017 Paris; Joël Lecharpy, 40, rue de Mauregard, 78690 Levis-Saint-Nom, both of France

[21] Appl. No.: 578,012

[22] Filed: Feb. 8, 1984

[30] Foreign Application Priority Data

Feb. 16, 1983 [FR] France .................. 83 02527

[51] Int. Cl.³ .................................... B60C 27/06
[52] U.S. Cl. ............. 152/213 A; 24/68 TT; 24/69 TT; 152/219; 152/221; 152/225 C; 152/229
[58] Field of Search ............ 192/208, 213 R, 213 A, 192/214, 216, 217, 219, 226, 225 R, 225 C, 229, 230, 243, 244, 220, 221, 222, 223; 24/20 CW, 20 TT, 68 TT, 69 TT, 339, 340, 274 WB

[56] References Cited

U.S. PATENT DOCUMENTS

| | | | |
|---|---|---|---|
| 1,499,036 | 6/1924 | Smith | 152/225 C |
| 2,424,478 | 7/1947 | Mason | 152/225 R |
| 3,400,744 | 9/1968 | Muller | 152/208 |
| 3,753,456 | 8/1973 | Saunders | 152/225 R |

FOREIGN PATENT DOCUMENTS

| | | |
|---|---|---|
| 371,288 | 3/1907 | France. |
| 384,779 | 4/1908 | France. |
| 2,052,061 | 4/1971 | France. |
| 2,499,485 | 4/1976 | Germany. |
| 2,377,897 | 8/1978 | France. |
| 2,907,903 | 10/1979 | Germany. |
| 2,421,767 | 11/1979 | France. |
| 2,451,280 | 10/1980 | France. |

Primary Examiner—William A. Powell
Assistant Examiner—Thomas Bokan
Attorney, Agent, or Firm—Lewis H. Eslinger

[57] ABSTRACT

A non-skid device for motor vehicle tires comprises at least two strands of cable joined at their ends and having adjustably threaded thereon a plurality of pairs of half-brackets separated from one another by cross pieces in contact with the tread of the tire. The half-brackets are symmetrically disposed and have two branches, a first branch of each half-bracket resting against the tire tread. The second branch of one of the half-brackets in each pair rests against one of the flanks of the tire, and the second branch of the remaining half-bracket rests against the other flank of the tire.

7 Claims, 4 Drawing Figures

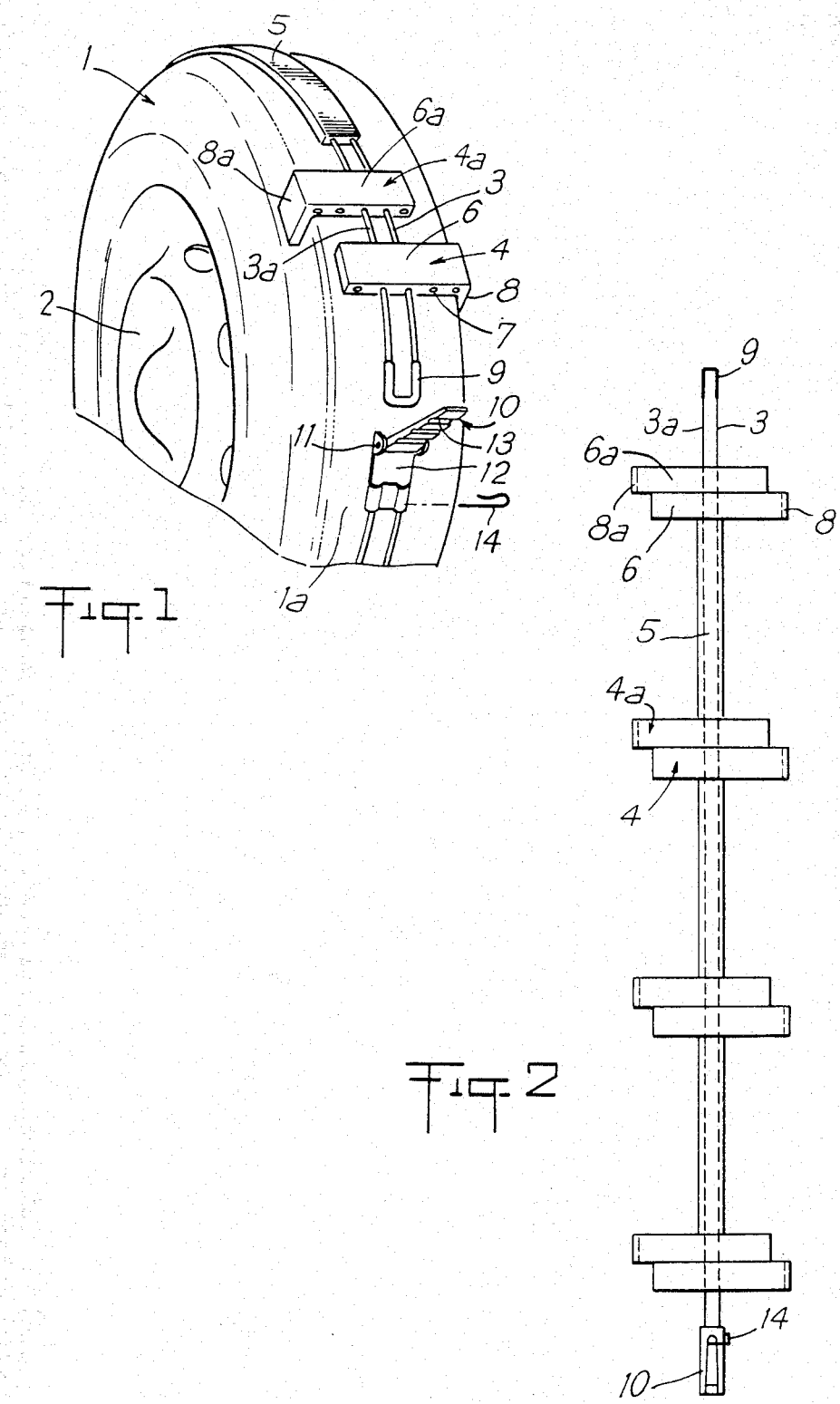

NON-SKID DEVICE FOR MOTOR-VEHICLE TIRES

The present invention relates to a non-skid device for motor-vehicle tires.

It is already known to use non-skid devices such as chains or other means provided with members designed to increase the grip on the ground, which devices are mounted on tires to allow motor-vehicles to travel on slippery grounds, such as covered with snow or ice.

These known devices however are designed and produced for specific tire dimensions, and are not adaptable to all tires.

Moreover, the currently used non-skid devices remain complex and difficult to fix for users who are often inexperienced.

It is the object of the present invention to overcome this, by proposing a non-skid device which comprises at least two strands of cable joined at their ends by fastening means and on which are adjustably threaded a plurality of pairs of half brackets forming crampons, separated one from the other by cross-pieces in contact with the tread of the tire, said half-brackets being symmetrically placed and having one branch which rests against the tire tread and another branch which rests, for one of the half-bracket, against one of the flanks of the tire, and for the other half-bracket, against the other flank of the tire.

The non-skid device according to the invention is polyvalent and is readily fixable in emergencies. Indeed, its construction is modular, this permitting to adjust the elements constituting it, in relation to the tire to be equipped.

In addition, the use of a locking lever and buckle makes the fastening operation secure and easy to perform.

Finally, the fact that the device is permanently resting on the ground considerably reduces vibrations and, consequently, rolling noises.

The invention will be more readily understood on reading the following description with reference to the accompanying drawings, in which:

FIG. 1 is a perspective view of a non-skid device according to the invention mounted on a pneumatic tire;

FIG. 2 is a plan view of the device according to the invention before being mounted;

Figure 3:
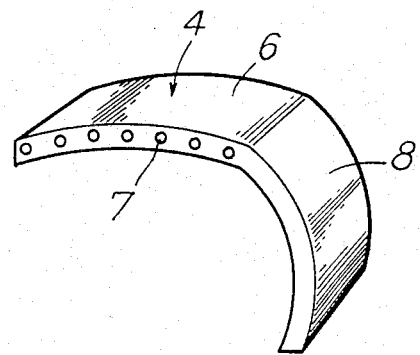
FIG. 3 is a perspective view of another embodiment of the half-bracket.

Referring first to FIG. 1, this shows a non-skid device according to the invention mounted on the pneumatic tire 1 of a motor-vehicle wheel 2. Said non-skid device comprises two strands 3, 3a of cable (FIGS. 1, 2) joined together at their end via a fastening piece, so as to constitute an endless cable, designed to encircle the tire. On strands 3, 3a of said cable are adjustably threaded a plurality of pairs of half-brackets 4, 4a forming crampons, said pairs of brackets being separated one from the other by cross-pieces 5 which are in contact with the tread of the tire 1.

The half-brackets 4, 4a are provided in one of their branches 6 in contact with the tire tread, with a series of holes 7 through which are selectively threaded the two strands 3, 3a of the cable, in such a way as to change the position of the two brackets at discretion to alter the distance between them and the width of the device proper, in relation to the size of the tires.

The two half-brackets 4, 4a are arranged symmetrically so that their branches 8, 8a which are substantially perpendicular to their other branches 6, 6a rest respectively against the opposite flanks of the tire.

Cross-pieces 5 which are constituted by strips of variable length are also provided with longitudinal holes 15, 15a into which are engaged the strands 3, 3a of cable, thus permitting to adjust the length of the chain as required, whilst the device remains in resting contact on the ground.

The two half-brackets 4, 4a as well as cross-pieces 5 are in plastomer or elastomer. The means used to fasten together the two ends of the cable consist of a buckle 9 fixed at one end of the cable strands 3, 3a and of a lever 10, mounted for pivoting about a pin 11, which is itself mounted on a support plate 12 secured at the other end of cable strands 3, 3a. The lever 10 is provided with notches 13 in which the buckle can be selectively engaged to adjust the length of the device.

The lever 10 is readily folded down in closed position because of its shape and a pin 14 is used as a safety means to lock the whole assembly in position.

FIG. 3 shows another embodiment of a half-bracket in which the branches 6 and 8 are incurved to adapt better to the shape of the tire tread and to the flanks of said tire.

Figure 4:
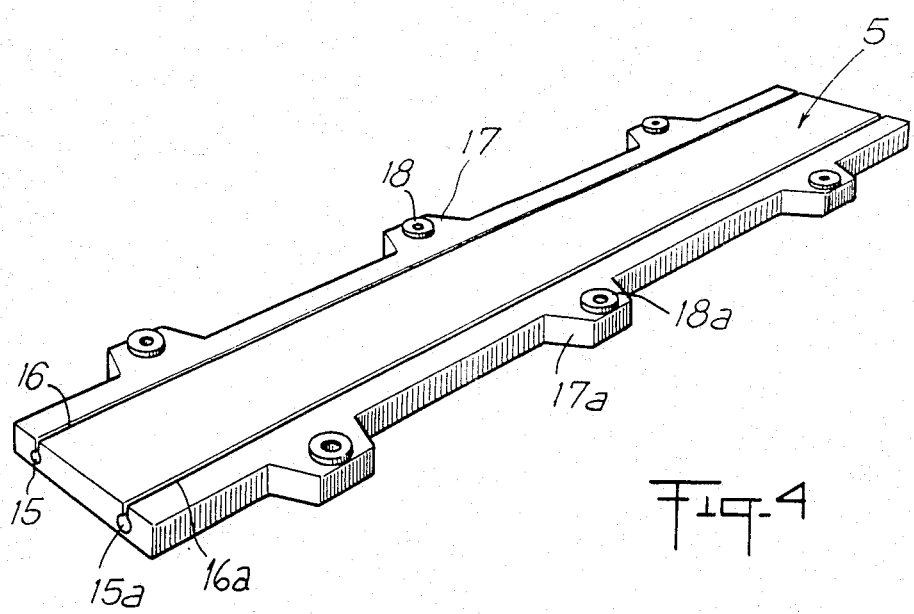
FIG. 4 is a perspective view of another embodiment of the cross-piece.

FIG. 4 shows another embodiment of a cross-piece with two longitudinal holes 15, 15a through which are threaded the strands 3, 3a of cable, said holes 15, 15a issuing on one of the faces through slots 16, 16a into which the cable strands are engaged. On the two opposed side faces of the strip constituting the cross-piece 5, are provided bosses 17, 17a with recesses 18, 18a in which spikes or nails (not shown) are mounted in known manner, their object being to increase the grip of the non-skid device.

The invention is in no way limited to the description given hereinabove and on the contrary covers any variants that can be brought thereto without departing from the scope or the spirit thereof.

What we claim is:

1. A non-skid device for pneumatic tires of motor-vehicles, wherein said device comprises at least two strands of cable joined at their ends by fastening means and on which are adjustably threaded a plurality of pairs of half-brackets, forming clamps, separated one from the other by cross-pieces in contact with the tread of the tire, said half-brackets being symmetrically placed and having one branch which rests against the tire tread and another branch which rests, for one of the half-bracket, against one of the flanks of the tire, and for the other half-bracket, against the other flank of the tire.

2. A device as claimed in claim 1, wherein said half-brackets are provided with a series of holes through which the two strands of cable can be selectively threaded, depending on the width of the tire.

3. A device as claimed in claim 1, wherein said cross-pieces are constituted of a flatstrip provided with two longitudinal holes into which are engaged the two strands of cable via slots issuing on to one of the faces of the cross-pieces.

4. A device as claimed in claim 1, wherein the two strands of cable present at one of their ends a buckle which is engageable in one of the notches of a lever mounted for pivoting at the other end of said strands of cable, and which is readily closed over because of its shape, safety means being provided to secure the locking.

5. A device as claimed in claim 1, wherein the strip constituting the cross-piece is provided on its two side faces with bosses with recesses for housing spikes or nails projecting with respect to the surface of said cross-pieces.

6. A device as claimed in claim 1, wherein said half-brackets and said cross-pieces are in plastomer.

7. A device as claimed in claim 1, wherein said half-brackets and said cross-pieces are in elastomer.

* * * * *